United States Patent [19]
Frei

[11] Patent Number: 5,987,938
[45] Date of Patent: Nov. 23, 1999

[54] TRAILER KINGPIN LOCKING APPARATUS

[76] Inventor: Roger E. Frei, c/o Box 8, Site 12, R.R. #9, Alberta, Canada, T2J 5G5

[21] Appl. No.: 09/179,907

[22] Filed: Oct. 28, 1998

[51] Int. Cl.$^6$ .............................. B60R 25/00; F16B 41/00
[52] U.S. Cl. .................................... 70/14; 70/58; 70/232; 70/258; 280/507
[58] Field of Search .................................. 70/54–56, 58, 70/14, 232, 258; 280/507

[56] References Cited

U.S. PATENT DOCUMENTS

| | | | |
|---|---|---|---|
| 2,641,124 | 6/1953 | Gallagher et al. | 280/507 |
| 3,415,085 | 12/1968 | Eble, Jr. | 70/56 |
| 3,780,546 | 12/1973 | Longenecker | 280/507 X |
| 3,832,872 | 9/1974 | Gerlach | 70/232 |
| 4,141,233 | 2/1979 | Reyes | 70/232 |
| 4,620,718 | 11/1986 | Mickelson | 280/507 |
| 4,841,756 | 6/1989 | Curtis | 70/232 |
| 5,052,203 | 10/1991 | Van Cuyk | 70/232 |
| 5,136,863 | 8/1992 | Richardson | 70/14 |
| 5,197,311 | 3/1993 | Clark | 280/507 X |
| 5,259,223 | 11/1993 | Nee | 70/232 |
| 5,297,407 | 3/1994 | Tarr | 70/232 |

OTHER PUBLICATIONS

The Coast Connector RV Catalogue, Jan. 1996, p. 469, Item #30901 —Fifth Wheel Lock.

*Primary Examiner*—Lloyd A. Gall
*Attorney, Agent, or Firm*—Emery Jamieson

[57] ABSTRACT

A trailer kingpin locking apparatus, for use with a trailer having a kingpin with an annular groove, features a lock body with a cylindrical opening to receive a kingpin. A padlock channel, running transversely to the axis of the kingpin opening and sized to accommodate the body of a padlock, extends partially into the sidewall of the lock body. A shackle channel, parallel to and narrower than the padlock channel, extends inward from the padlock channel and intercepts the kingpin opening to form an opening thereinto. A retaining pin bridges the shackle channel near the kingpin opening. The locking apparatus may be slipped over a kingpin such that the shackle channel coincides with the annular groove of the kingpin. The shackle of a standard padlock is inserted into the shackle channel and around the retaining pin, with the shackle projecting partially into the annular groove and preventing the locking apparatus from being slipped off of the kingpin. The padlock is then closed, with the body of the padlock projecting partially into the padlock channel, such that the shackle is entirely enclosed within the lock body and is inaccessible to bolt cutters or similar tools.

5 Claims, 3 Drawing Sheets

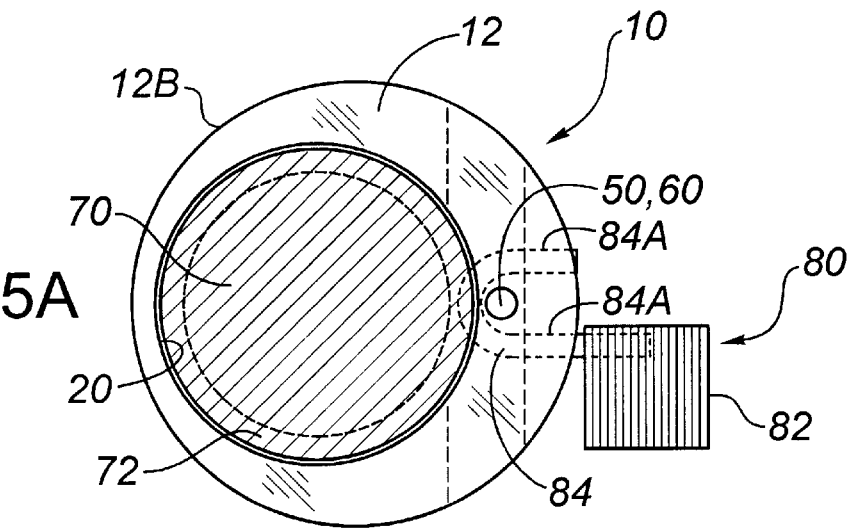
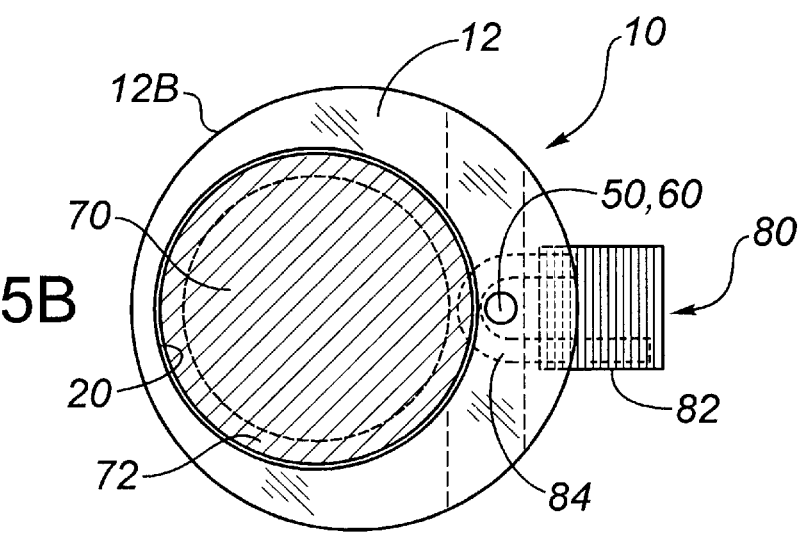
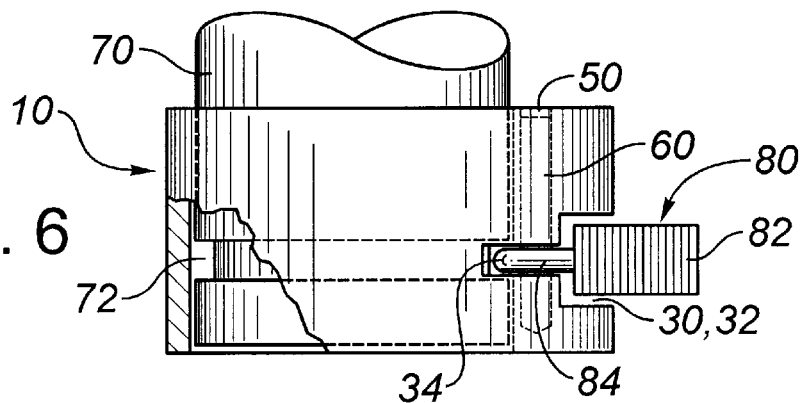

TRAILER KINGPIN LOCKING APPARATUS

FIELD OF THE INVENTION

The present invention relates to locking apparatus for deterring or preventing theft of fifth-wheel recreation vehicles and other types of highway trailers, and relates in particular to locking apparatus which use conventional padlocks.

BACKGROUND OF THE INVENTION

Fifth-wheel recreation vehicles (or "RV's") and other types of highway trailers are commonly hitched to trucks by means of a trailer kingpin, which is a solid round bar with an annular groove cut into its perimeter. The kingpin is rigidly mounted to the trailer near the front of the trailer, projecting downward, and is adapted to fit into the hitch plate (or "fifth wheel") of a truck to which the trailer is being hitched. The fifth wheel engages the annular groove of the kingpin so as to prevent disengagement, while permitting rotation of the kingpin about its vertical axis so that the truck/trailer combination may negotiate turns.

Theft of trailers, and particularly RV trailers, has been a serious problem for many years. The simplicity of the kingpin hitch apparatus makes it quick and easy for a thief to hitch a truck to an unattended trailer and then abscond therewith. Accordingly, it is desirable to be able to lock the kingpin of so as to prevent engagement with a fifth wheel, and it is particularly desirable to be able to accomplish this with the convenience of a conventional padlock.

A simple attempt to accomplish this objective is illustrated by the prior art locking sleeve shown in FIG. 1 appended hereto. This is a simple cylindrical sleeve having an inner diameter slightly larger than the diameter of a kingpin, and having a pair of circumferential slots separated by a bridging section of the sleeve wall. The sleeve may be slipped over a kingpin, with the circumferential slots coinciding with the annular groove of the kingpin. The shackle of a conventional padlock may then be looped around the bridging section of the sleeve wall so that part of the shackle projects into the annular groove, thereby preventing the sleeve from being slipped off of the kingpin.

The locking sleeve described above is inexpensive to make and simple to use. It has a significant drawback, however, in that most of the padlock shackle is left exposed and readily accessible to bolt cutters or other tools which can quickly shear through the shackle so that the lock and the sleeve may be removed.

U.S. Pat. No. 4,841,756, issued to Curtis on Jun. 27, 1989, discloses one attempt to lock a kingpin by positioning a padlock shackle partly within the kingpin groove while protecting the entire shackle from access to bolt cutters. The Curtis device has a cylindrical sleeve section which may be slipped over a kingpin, plus an attached padlock enclosure body which has a recess shaped to receive and enclose both the shackle and the main body of the padlock. The inner surfaces of the padlock enclosure body define a bulge which the shackle can be positioned over and around. When so positioned, the shackle projects partly into the annular groove of the kingpin, thereby locking the device onto the kingpin. In the addition, the bulge inside the recess is shaped so as to prevent the shackle from passing outwardly over the bulge when the padlock body is inside the recess and engaged with the shackle.

The Curtis device avoids the major disadvantage of the locking sleeve by enclosing the padlock shackle completely within the body of the device, making the shackle inaccessible to bolt cutters. However, the Curtis device has substantial drawbacks of its own. First, it may be used only with a padlock the body and shackle of which are closely matched to the shape of the padlock recess. It cannot be used with padlocks which are too large or too small to fit the recess, or with padlocks which are of a generally suitable size but of an incompatible configuration. Moreover, in order to function satisfactorily with a selected style of padlock, the Curtis device must be fabricated to precise internal shapes and very close tolerances, making it comparatively expensive to manufacture.

For the foregoing reasons, there is a need for an anti-theft locking apparatus:
(a) which utilizes a conventional padlock and provides for the shackle of the padlock to be partially inserted into the annular groove of a kingpin so as to prevent the apparatus from being removed from the kingpin;
(b) which effectively renders the entire length of the padlock shackle inaccessible to bolt cutters; and
(c) which is simple and economical to fabricate compared with other devices achieving the same general objectives.

BRIEF SUMMARY OF THE INVENTION

In one aspect, the present invention is a trailer kingpin locking apparatus, for use with a trailer kingpin having an annular groove, and for use with a padlock having a generally U-shaped shackle, said invention comprising:
(a) a lock body having an upper end and a lower end, and defining a cylindrical kingpin opening slightly larger in diameter than the diameter of the kingpin, and further defining a lock body wall surrounding the kingpin opening, said lock body wall defining:
  (i) an inner surface and an outer surface; and
  (ii) an open trough oriented generally transversely to the axis of the kingpin opening, said trough penetrating the outer surface of the lock body wall substantially throughout the length of the trough, extending radially inward through the lock body wall, and intercepting the kingpin opening so as to form an opening thereinto; and
(b) a shackle-retaining element disposed within the trough and spanning substantially across the trough in a direction parallel to the axis of the kingpin opening, said shackle-retaining element being positioned such that the padlock shackle will project partially into the kingpin opening when the shackle is hooked around the shackle-retaining element.

In the preferred embodiment, the trough is divided has two sections, namely:
(a) a padlock channel extending partially through the thickness of the lock body wall from said outer surface toward said inner surface; and
(b) a shackle channel contiguous with the padlock channel, and intercepting the kingpin opening so as to form an opening thereinto.

In the preferred embodiment, the outer surface of the lock body wall defines a circular shape when the invention is viewed in plan. However, the outer surface of the lock body may take any of a variety of curvilinear or polygonal shapes without affecting the function of the invention.

Also in the preferred embodiment, the shackle-retaining element will be a round retainer pin projecting into the shackle channel through a corresponding vertical slot drilled into the lock body wall. The use of a retainer pin for this purpose is particularly convenient for ease of fabrication; however, various other forms of shackle-retaining element would perform the required function equally as well as the retainer pin of the preferred embodiment.

BRIEF DESCRIPTION OF THE DRAWINGS

Embodiments of the invention will now be described with reference to the accompanying figures, in which numerical references denote like parts, and in which:

FIG. 5a is a plan view of the preferred embodiment of the invention, in a first stage of being mounted onto a trailer kingpin.

FIG. 5b is a plan view of the preferred embodiment of the invention, in a second stage of being mounted onto a trailer kingpin.

FIG. 6 is side view of the preferred embodiment of the invention, mounted onto a trailer kingpin.

DETAILED DESCRIPTION OF THE PREFERRED EMBODIMENT

Figure 1:
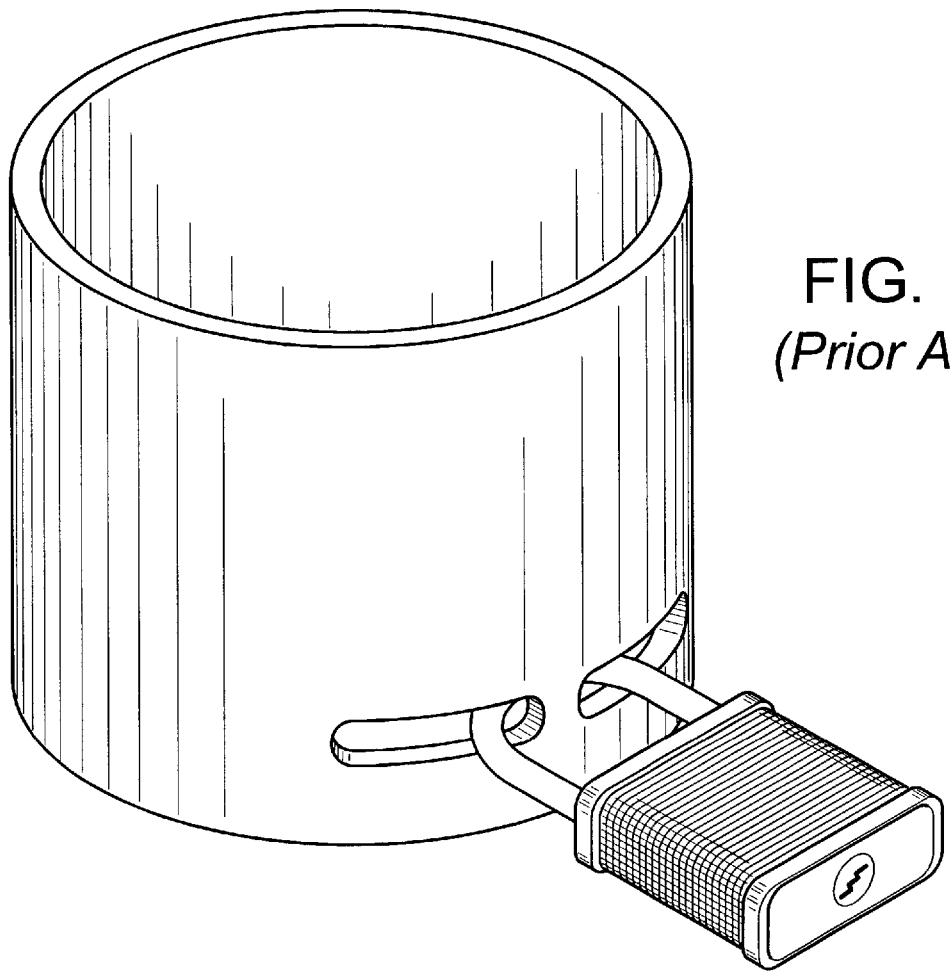
FIG. 1 illustrates a prior art locking sleeve.
Figure 2:
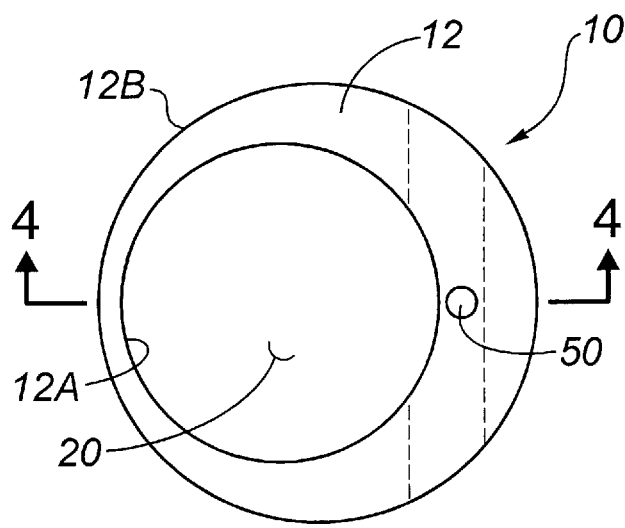
FIG. 2 is a plan view of the preferred embodiment of the invention.
Figure 3:
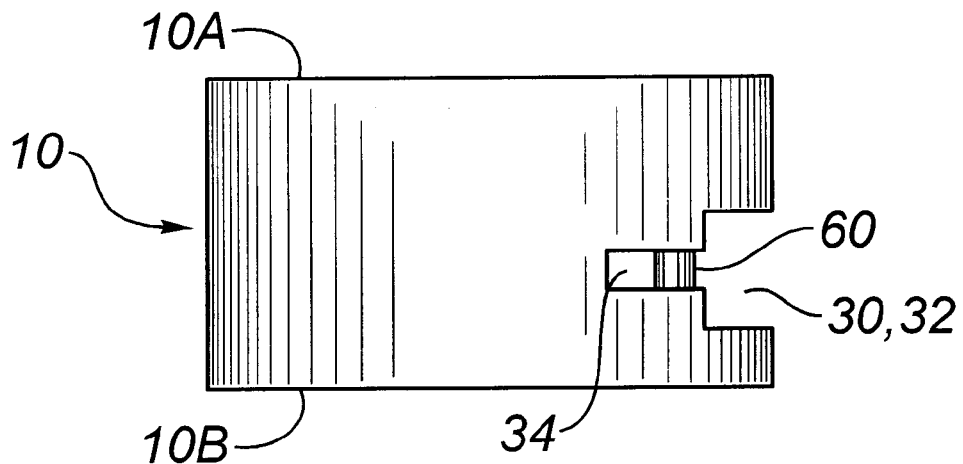
FIG. 3 is a side view of the preferred embodiment.
Figure 4:
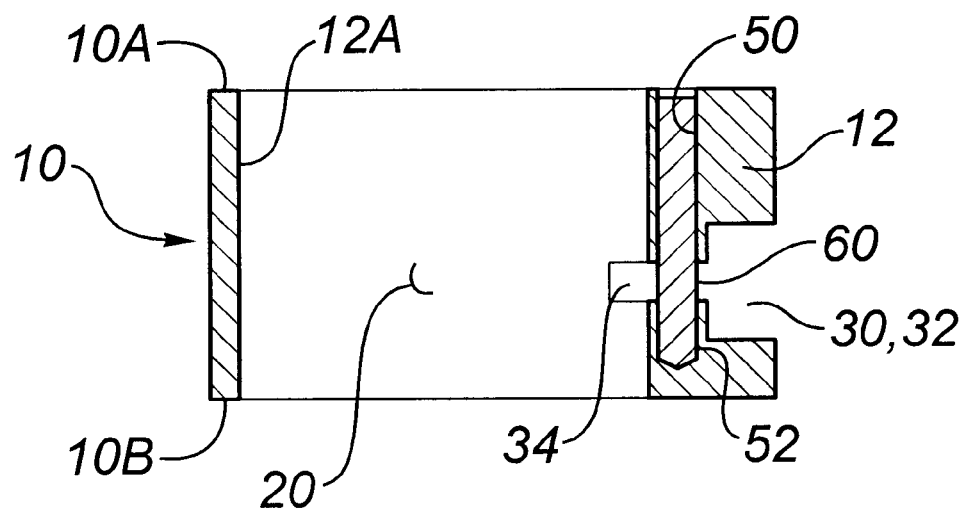
FIG. 4 is a cross-sectional view of the preferred embodiment.

Referring to FIGS. 2, 3 and 4, the present invention has a main lock body (10) having an upper end (10a) and a lower end (10b). Formed into the lock body (10) is a vertical cylindrical kingpin opening (20) having a diameter only slightly larger than that of a kingpin on which the invention is to be mounted, such that the kingpin may be inserted into the kingpin opening (20) with minimal side clearance. In the preferred embodiment, as illustrated in FIGS. 3 and 4, the kingpin opening (20) passes completely through the lock body (10) from upper end (10a) to lower end (10b). However, the kingpin opening (20) may extend only partially through the lock body (10) without departing or detracting from the essential principles and function of the invention.

The lock body (10) comprises lock body wall (12) surrounding the kingpin opening (20), and having an inner surface (12a) and an outer surface (12b). Formed into the lock body wall (12) is an open trough (30) which in the preferred embodiment further defines, firstly, a padlock channel (32) running transversely to the axis of the kingpin opening (20) and extending from a point on the outer surface (12b) of the lock body wall (12) partly through the thickness of the lock body wall (12), and, secondly, a shackle channel (34) which is contiguous with and parallel to the padlock channel (32). The shackle channel (34) extends inward from the padlock channel (32) through to the inner surface (12a) of the lock body wall (12), so as to form an opening between the shackle channel (34) and the kingpin opening (20).

Disposed within the shackle channel (34) is a shackle-retaining element which the shackle of a padlock may be hooked around. The shackle-retaining element is positioned such to that the portion of the padlock shackle passing around it will necessarily project substantially beyond inner surface (12a) of the lock wall body (12) and into kingpin opening (20). In the preferred embodiment, the shackle-retaining element is a retainer pin (60) which passes into the shackle channel (34) upon being inserted into an upper retainer pin slot (50) formed into the upper portion of the lock body wall (12) as shown in FIGS. 2, 3 and 4. Also in the preferred embodiment, retainer pin (60) will extend into a lower retainer pin slot (52) formed into the lower portion of lock body wall (12). However, provision of the lower retainer pin slot (52) is not essential to the effective functioning of the retainer pin (60).

The intended use of the present invention may be understood from FIGS. 5a, 5b, and 6. The lock body (10) is slipped around a kingpin (70) having a perimeter annular groove (72), such that the shackle channel (34) is aligned with the annular groove (72). A conventional padlock (80), comprising a padlock body (82) plus a U-shaped shackle (84) having two shackle legs (84a), while in its "open" configuration, is positioned such that the shackle (84) hooks around the retainer pin (60), as illustrated in FIG. 5a. Because the retainer pin (60) is closely adjacent to the inner surface (12a) of the lock body wall (12), a portion of the shackle (84) projects inwardly beyond the inner surface (12a) and into the annular groove (72).

The relative dimensions of the padlock (80) and the lock body (10) are selected such that the padlock body (82) may be rotated, from the position shown in FIG. 5a, into alignment with both shackle legs (84a), without interfering with the lock body (10). After being so rotated, the padlock body (82) may be pushed inward so as to lockingly engage the shackle (84). When the padlock (80) is thus in its "locked" configuration, the padlock body (82) will extend partially into the padlock channel (32), with the resultant effect that no portion of the shackle (84) projects outside the outer surface (12b) of the lock body wall (12), and the shackle (84) is therefore inaccessible to bolt cutters or other tools which a trailer thief might have wanted to use in order to remove the apparatus and expose the kingpin.

It is not essential to the invention for the trough (30) to have a distinctly defined padlock channel (32) and shackle channel (34) as illustrated in FIGS. 3 and 4. The sidewall groove (30) may be configured in a variety of shapes without affecting the concept or function of the present invention. What is essential is that the trough (30) be of such configuration and dimensions that the shackle (84) of the padlock (80) may be introduced into the trough (30) and hooked around the shackle-retaining element, while allowing the padlock body (82) to lockingly engage the shackle (84) such that the shackle is effectively protected against access by bolt cutters or similar tools.

It will be readily seen by those skilled in the art that various modifications of the present invention may be devised without departing from the essential concept of the invention, and all such modifications are intended to be included in the scope of the claims appended hereto.

The embodiments of the invention in which an exclusive property or privilege is claimed are defined as follows:

1. For use with a trailer kingpin having an annular groove, and with a padlock having a generally U-shaped shackle, a trailer kingpin locking apparatus comprising:

(a) a lock body having an upper end and a lower end, and defining a cylindrical kingpin opening slightly larger in diameter than the diameter of the kingpin, and further defining a lock body wall surrounding the kingpin opening, said lock body wall defining:

(i) an inner surface and an outer surface; and (ii) an open trough oriented generally transversely to the axis of the kingpin opening, said trough penetrating the outer surface of the lock body wall substantially throughout the length of the trough, extending radially inward through the lock body wall, and intercepting the kingpin opening so as to form an opening thereinto; and (b) a shackle-retaining element disposed within the trough and spanning substantially across the trough in a direction parallel to the axis of the kingpin opening, said shackle-retaining element being positioned such that the padlock shackle will project partially into the kingpin opening when the shackle is hooked around the shackle-retaining element.

2. The trailer kingpin locking apparatus of claim 1 wherein the trough defines:

(a) a padlock channel extending parially through the thickness of the lock body wall from said outer surface toward said inner surface; and (b) a shackle channel contiguous with the padlock channel, and intercepting the kingpin opening so as to form an opening thereinto.

3. The trailer kingpin locking apparatus of claim 2 wherein:

(a) the lock body wall defines an upper retainer pin slot extending between the upper end of the lock body and the shackle channel; and (b) the shackle-retaining element is a retainer pin which may be inserted through said upper retainer pin slot so as to traverse the shackle channel.

4. The trailer kingpin locking apparatus of claim 3 wherein the lock body wall further defines a lower retainer pin slot below the shackle channel, said lower retainer pin slot being coaxial with the upper retainer pin slot such that the retainer pin may be inserted through the upper retainer pin slot and into the lower retainer pin slot.

5. The trailer kingpin locking apparatus of claim 1 further including a padlock comprising a padlock body and a generally U-shaped shackle having two shackle legs, one shackle leg being pivotably and extensibly mounted to the padlock body, and the other shackle leg being lockably engageable with the padlock body.

\* \* \* \* \*